United States Patent
Djenguerian et al.

(10) Patent No.: US 8,355,266 B2
(45) Date of Patent: *Jan. 15, 2013

(54) APPARATUS AND METHOD FOR SENSING OF ISOLATED OUTPUT

(75) Inventors: Alex B. Djenguerian, Saratoga, CA (US); Arthur B. Odell, Morgan Hill, CA (US); Henson Wu, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,000

(22) Filed: Feb. 16, 2012

(65) Prior Publication Data

US 2012/0147632 A1 Jun. 14, 2012

Related U.S. Application Data

(63) Continuation of application No. 12/770,478, filed on Apr. 29, 2010, now Pat. No. 8,144,487.

(51) Int. Cl.
*H02M 3/335* (2006.01)

(52) U.S. Cl. ............... 363/21.12; 363/21.04; 363/21.08; 363/21.16

(58) Field of Classification Search ................ 323/282; 363/21.04, 21.07, 21.08, 21.12, 21.15, 21.16, 363/97

See application file for complete search history.

(56) References Cited

U.S. PATENT DOCUMENTS

| | | | | |
|---|---|---|---|---|
| 5,991,171 A | * | 11/1999 | Cheng | 363/21.03 |
| 6,018,469 A | * | 1/2000 | Poon | 363/20 |
| 6,956,750 B1 | | 10/2005 | Eason et al. | |
| 7,593,245 B2 | * | 9/2009 | Djenguerian et al. | 363/95 |
| 8,144,487 B2 | * | 3/2012 | Djenguerian et al. | 363/21.12 |
| 2008/0031017 A1 | | 2/2008 | Ng et al. | |
| 2008/0123372 A1 | | 5/2008 | Yang | |
| 2010/0232187 A1 | | 9/2010 | Yang et al. | |
| 2011/0157936 A1 | | 6/2011 | Huynh | |
| 2011/0182089 A1 | * | 7/2011 | genannt Berghegger | 363/21.13 |

* cited by examiner

*Primary Examiner* — Adolf Berhane
*Assistant Examiner* — Fred E Finch, III
(74) *Attorney, Agent, or Firm* — Blakely Sokoloff Taylor & Zafman LLP

(57) ABSTRACT

A controller for use in a power converter includes a control circuit to be coupled to a current controller coupled to an energy transfer element. A first, second or third current is enabled in the current controller in response to the control circuit. The first current is substantially zero, the second current is greater than the third current, and the third current is greater than the first current. The third current only partially discharges a capacitance coupled to a terminal coupled between the energy transfer element and the current controller. A first feedback circuit coupled to the control circuit generates a first feedback signal after a full discharge pulse of current through the current controller. A second feedback circuit coupled to the control circuit generates a second feedback signal after a partial discharge pulse of current through the current controller.

11 Claims, 6 Drawing Sheets

APPARATUS AND METHOD FOR SENSING OF ISOLATED OUTPUT

REFERENCE TO PRIOR APPLICATION(S)

This is a continuation of U.S. application Ser. No. 12/770,478, filed Apr. 29, 2010. U.S. application Ser. No. 12/770,478 is hereby incorporated by reference.

BACKGROUND INFORMATION

1. Field of the Disclosure

This invention is related to the control of switched-mode power supplies. Specifically, it is related to low-cost power supplies with regulated isolated outputs that must meet standards for maximum power consumption when the output has no load, and yet must keep the output within specified limits when a load is suddenly applied.

2. Background

Low-cost solutions to regulate an isolated output voltage of a switching power supply typically rely on the magnetic coupling between isolated windings of an energy transfer element to provide information about the output to a control circuit. The control circuit typically receives a signal representative of the output voltage immediately after a switching event that delivers energy to the output. The signal is typically received from a primary-referenced winding of an energy transfer element instead of from an optocoupler. This type of control is often referred to as "primary-side control" or control using primary-side feedback.

Although these solutions eliminate the cost and the power consumed by an optocoupler, they cannot sense the output voltage in the absence of switching. A problem arises when the load on the output of the power supply approaches zero. The power supply must provide the specified regulated output voltage but almost no power. Under such conditions, the power lost in the operation of the power supply itself is a significant part of the total power consumed. Requirements to limit the consumption of power by the power supply under conditions of near zero external loading discourage the use of a dummy internal load in a power supply. A dummy internal load, sometimes called a pre-load, can be useful in a power supply to help provide overvoltage protection, improve regulation between multiple outputs, and prevent the switching frequency from going below a minimum value. In particular, a dummy internal load is a small permanent minimum load inside a power supply. However, a penalty for using a dummy internal load is that the power supply becomes less efficient because the dummy load dissipates power that is not measured as output power. Also, the controller has to switch more often to power the additional internal load, which results in the power supply consuming additional power even though there is no load connected to the power supply's output. To avoid these drawbacks, it is useful to increase the time between switching events under no-load conditions to reduce the losses inherent in switching. However, under such conditions, the controller is unable to sense the output voltage during the relatively long intervals between switching events.

When a substantial load is suddenly applied to the output during one of the relatively long intervals between switching events, the output voltage can easily fall outside the specified limits of regulation before the controller is able to respond to the condition. A typical remedy for such a condition is the addition of costly bulk capacitance to the output to provide the energy required by a load that could be applied during the time when the controller cannot sense the output.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for implementing a power supply controller that provide relatively low cost solutions that accomplish sensing of an isolated output of a power converter are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
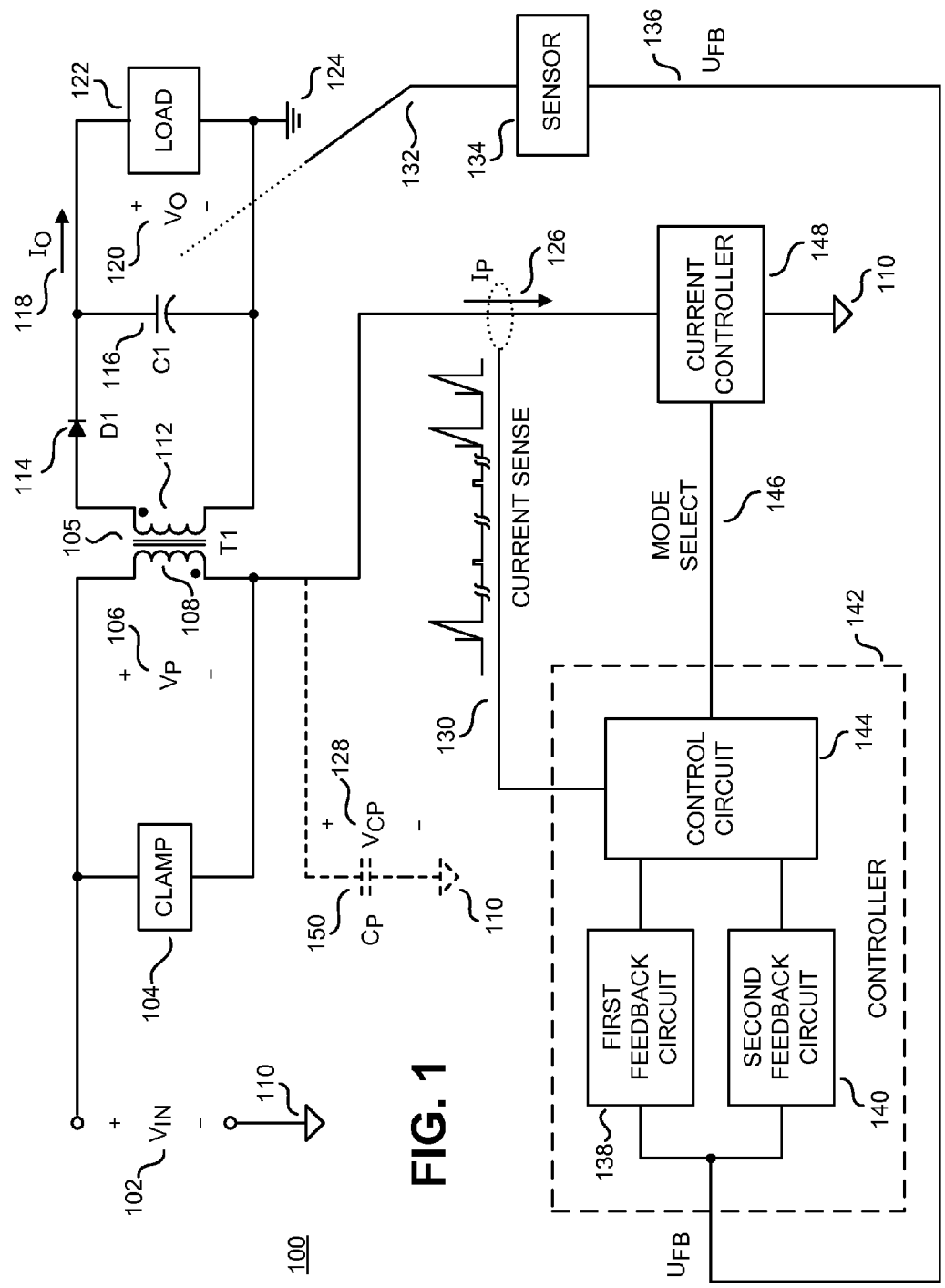
FIG. 1 shows an example power converter including a controller in accordance with the teachings of the present invention that provides sensing of an isolated output.

FIG. 1 is a schematic diagram that shows generally one example of a switching power converter 100 that uses a flyback topology in accordance with the teachings of the present invention. In the illustrated example, power converter 100 is shown as a power supply having flyback topology for explanation purposes. It is noted, however, that there are many other known topologies and configurations for switching power supplies. It is appreciated that the example flyback topology illustrated in FIG. 1 is adequate for explaining principles in accordance with the teachings of the present invention and that the principles may apply also to other types of switching regulators in accordance with the teachings of the present invention. Details that will be discussed in greater detail below are omitted from FIG. 1 to avoid obscuring teachings in accordance with the present invention.

The example power converter in FIG. 1 controls the transfer of energy from an unregulated input voltage $V_{IN}$ 102 at the input of the power converter 100 to a load 122 at the output of the power converter 100. The input voltage $V_{IN}$ 102 is coupled to an energy transfer element T1 105 and a current controller 148. In the example of FIG. 1, the energy transfer element T1 105 is a coupled inductor, sometimes referred to as a transformer, with a primary winding 108 and a secondary winding 112. In the example of FIG. 1, primary winding 108 may be considered an input winding, and secondary winding 112 may be considered an output winding. A clamp circuit 104 is coupled to the primary winding 108 of the energy transfer element T1 105 to control the maximum voltage on the current controller 148.

In the example of FIG. 1, input voltage $V_{IN}$ 102 is positive with respect to an input return 110, and output voltage $V_O$ 120 is positive with respect to an output return 124. The example of FIG. 1 shows galvanic isolation between the input return 110 and the output return 124 because input return 110 and output return 124 are designated by different symbols. In other words, a dc voltage applied between input return 110 and output return 124 will produce substantially zero current. Therefore, circuits electrically coupled to the primary winding 108 are galvanically isolated from circuits electrically coupled to the secondary winding 112.

In the illustrated example, current controller 148 either conducts current or does not conduct current in response to a control circuit 144 that is included in a controller 142. Current controller 148 and controller 142 may include integrated circuits and discrete electrical components. In some examples, current controller 148 and controller 142 may be integrated together in a single monolithic integrated circuit.

In the example of FIG. 1, current controller 148 controls a current $I_P$ 126 in response to controller 142 to meet a specified performance of the power converter 100. In operation, current controller 148 produces pulsating current in primary winding 108 and in secondary winding 112. Current in secondary winding 112 is rectified by rectifier D1 114 and then filtered by capacitor C1 116 to produce a substantially constant output voltage $V_O$ 120 or output current $I_O$ 118 at the load 122. The operation of current controller 148 also produces a time varying voltage $V_P$ 106 between the ends of primary winding 108. By transformer action, a scaled replica of the voltage $V_P$ is produced between the ends of secondary winding 112, the scale factor being the ratio that is the number of turns of secondary winding 112 divided by the number of turns of primary winding 108.

The example illustrated in FIG. 1 shows a capacitor $C_P$ 150 in broken lines at the node between one end of primary winding 108 and current controller 148. Capacitor $C_P$ 150 in the example of FIG. 1 represents all the capacitance that couples to current controller 148. Capacitor $C_P$ 150, which could be referred to as the primary switching node capacitance, may include natural capacitance internal to energy transfer element T1 105 as well as the natural internal capacitance of current controller 148. Capacitor $C_P$ 150 may also include discrete capacitors placed intentionally in various parts of the circuit to filter noise and to slow transitions of switching voltages. Capacitor $C_P$ 150 has a voltage $V_{CP}$ 128 that is the voltage at one end of primary winding 108 with respect to the input return 110. The importance of capacitor $C_P$ 150 will become apparent later in this disclosure.

In the example of FIG. 1, a sensor 134 receives a sense signal 132 that is representative of the output quantity to be regulated at the output of power converter 100. The output quantity to be regulated by controller 142 is typically the output voltage $V_O$ 120, but in some examples is the output current $I_O$ 118, and in other examples may be a combination of output voltage $V_O$ 120 and output current $I_O$ 118. Controller 142 receives a feedback signal $U_{FB}$ 136 from sensor 134. Feedback signal $U_{FB}$ 136 may be either a voltage or a current.

Since circuits electrically coupled to the secondary winding 112 are galvanically isolated from the circuits electrically coupled to the primary winding 108, either the sense signal 132 is galvanically isolated from the load 122, or sensor 134 provides galvanic isolation between sense signal 132 and controller 142. In other words, galvanic isolation may reside in either the sensor 134 or in another part of the path of the sense signal 132 not shown in FIG. 1.

In the example of FIG. 1, controller 142 receives a current sense signal 130 that is representative of the current $I_P$ 126. Current sense signal 130 may be either a voltage or a current and may be obtained using known methods. For example, current sense signal 130 may be the output of a current transformer, the voltage across a current sense resistor, or the voltage across the on-resistance of a metal oxide field-effect transistor MOSFET that conducts either the entire current $I_P$ 126 or a portion of the current $I_P$ 126.

In the example of FIG. 1, controller 142 receives feedback signal $U_{FB}$ 136 and current sense signal 130 to produce a mode select signal 146 that is received by current controller 148. In one example, current controller 148 may have three modes of operation. A first mode may be one that does not conduct current, such that current $I_P$ 126 is substantially zero when current controller 148 is the first mode. A second mode may be one that conducts as much current as external circuitry allows, such as for example the condition where the current in the primary winding 108 of energy transfer element T1 105 is determined by the input voltage $V_{IN}$, the inductance of primary winding 108, and the time that current controller 148 remains in the second mode. A third mode may be one that restricts conduction of current to a relatively small value during the time the current controller 148 remains in the third mode in accordance with the teachings of the present invention. In one example, the relatively small value for the current is a constant current value that is substantially less than the current value during the second mode. In one example, the relatively small constant current value of the third mode is 5 per cent of the maximum current conducted in the second mode.

In the example of FIG. 1, feedback signal $U_{FB}$ 136 has substantially different characteristics that depend on the changes in modes of current controller 148 in accordance with the teachings of the present invention. For example, when current controller 148 changes between the second mode and the first mode, the feedback signal $U_{FB}$ 136 contains features that are not present when current controller 148 changes between the third mode and the first mode. Therefore, controller 142 includes a first feedback circuit 138 and a second feedback circuit 140 to interpret the feedback signal $U_{FB}$ 136 appropriately for the different modes of current controller 148 in accordance with the teachings of the present invention. Examples of other controllers may include more than two feedback circuits as required to interpret feedback signals that arise from different modes of operation.

In the example of FIG. 1, control circuit 144 included in controller 142 receives signals from first feedback circuit 138 and second feedback circuit 140 to control the output of the power converter as desired. Feedback circuits included in controller 142 may use any analog and digital circuits such as filter circuits, sample and hold circuits, and comparators, to extract necessary information from feedback signal $U_{FB}$ 136. Control circuit 144 included in controller 142 may use any analog and digital circuits, such as oscillators, comparators, digital logic, and state machines, or the like, to interpret and respond as required to information received from the feedback circuits.

FIG. 1 shows mode select signal 146 as a single line that in another example may represent several individual analog or digital signals. For example, two binary digital signals lines for control signal 146 may select as many as four distinct modes of current controller 148 in accordance with the teachings of the present invention.

Figure 2:
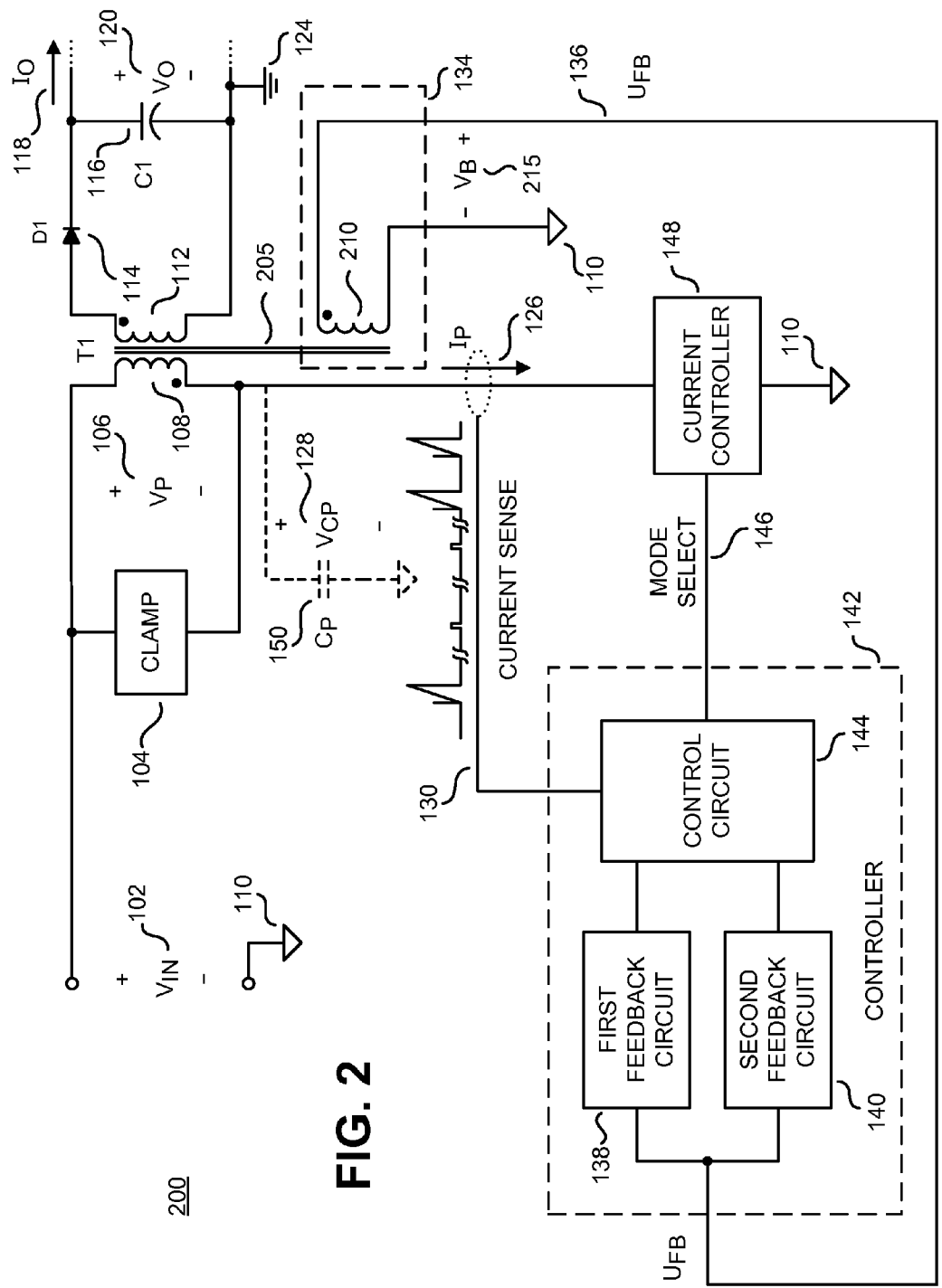
FIG. 2 is an example of a power converter including a controller that uses a winding on a coupled inductor to sense output voltage in accordance with the teachings of the present invention and that provides sensing of an isolated output.

FIG. 2 is a schematic diagram that shows another example of a switching power converter 200 that uses a flyback topology in accordance with teachings of the present invention. The example of FIG. 2 includes a coupled inductor 205 that has a primary winding 108, a secondary winding 112, and a bias winding 210. Bias winding 210 may also be referred to as an auxiliary winding. In one example, bias winding 210 in FIG. 2 is the sensor 134 introduced in FIG. 1 that produces feedback signal $U_{FB}$ 136. Bias winding 210 produces a voltage $V_B$ 215 that is responsive to the output voltage $V_O$ 120 when rectifier D1 114 on secondary winding 112 conducts. Sense signal 132, shown in FIG. 1 but not visible in FIG. 2, is the magnetic flux that couples bias winding 210 to secondary winding 112 of the coupled inductor 205. In another example, bias winding 210 may also provide a source of power to the circuits within controller 142.

It is appreciated that many variations are possible in the use of a bias winding to sense an output voltage and for providing sensing while also providing power to a controller with galvanic isolation. For example, a bias winding may apply a rectifier and a capacitor similar to rectifier D1 114 and capacitor C1 116, respectively, to produce a dc bias voltage while providing an ac feedback signal from the anode of the rectifier. As such, additional passive components such as resistors may be used on the bias winding to scale the voltage from the winding to a value that is more suitable to be received by controller 142.

Use of bias winding 210 to sense output voltage $V_O$ 120 has the advantages of providing galvanic isolation between output voltage $V_O$ 120 and controller 142 without the expense of an optocoupler. A disadvantage of using a winding on coupled inductor 205 to sense output voltage $V_O$ 120 is that the voltage $V_B$ 215 at bias winding 210 is representative of output $V_O$ 120 only when output rectifier D1 114 is conducting, whereas an optocoupler can provide continuous sensing of output voltage $V_O$ 120. Output rectifier D1 114 is conducting only while there is a pulse of current in secondary winding 112. Therefore, the time between pulses of current in secondary winding 112 is the time when controller 142 cannot sense output voltage $V_O$ 120. In other words, in contrast to sensing output voltage $V_O$ 120 continuously with an optocoupler, sensing output voltage $V_O$ 120 with a winding on coupled inductor 205 is limited to pulses that may not occur often enough to provide the necessary information for the desired control of output voltage $V_O$ 120. Since secondary winding 112 has a pulse of current only after primary winding 108 has a pulse of current, it is desirable to decrease the time between pulses of current in primary winding 108 so that controller 142 can sense output voltage $V_O$ 120 more often.

The rate and magnitude of pulsating current in primary winding 108 is controlled by controller 142 to provide the power required to maintain the desired output voltage $V_O$ 120 over a range of values of load 122. As the load approaches zero, less current in primary winding 108 is needed to maintain the desired output voltage $V_O$ 120. As such, controllers may reduce the magnitude of the current in primary winding 108 as well as increase the time between pulses of current.

Controller 142 may produce pulses of current in primary winding 108 by providing current controller 148 with a mode select signal 146 that changes current controller 148 from the first mode to the second mode, allowing current $I_P$ 126 to increase with a linear slope to a desired maximum before returning to the first mode. Operation of current controller 148 in the second mode fully discharges capacitor $C_P$ 150 so that voltage $V_P$ 106 on primary winding 108 is equal to input voltage $V_{IN}$ 102.

All the energy stored on capacitor $C_P$ 150 is lost when current controller 148 operates in the second mode, even if the maximum current $I_P$ 126 is allowed to increase to the lowest practical value before returning to the first mode. The only way to reduce the power dissipated from the full discharge of capacitor $C_P$ 150 is to increase the time between discharges. In other words, increasing the time between pulses of primary current will reduce the power lost in the power converter as the load approaches zero at the expense of increasing the time where the controller 142 cannot sense the output voltage $V_O$ 120. As a consequence, a sudden increase in the load 122 may reduce the output voltage $V_O$ 120 to an unacceptable value before controller 142 can sense the voltage and respond to it.

A solution is discussed below that allows the controller 142 to sense the output voltage $V_O$ 120 frequently enough to respond adequately to a sudden increase in the load 122 while also reducing power dissipation at near zero load. This solution produces pulses of current in primary winding 108 without fully discharging capacitor $C_P$ 150. The solution is realized by the introduction of a third mode of operation for current controller 148 in accordance with the teachings of the present invention. In one example, the third mode of current controller 148 operates to put only enough current into primary winding 108 so that output rectifier D1 114 will conduct after current controller 148 returns to the first mode. The third mode of current controller 148 conducts current with a sufficiently low magnitude and duration to put the desired current into the primary winding while only partially discharging capacitor $C_P$ 150 in accordance with the teachings of the present invention. The determination of the proper value of current for a given application is discussed in detail later in this disclosure.

Figure 3:
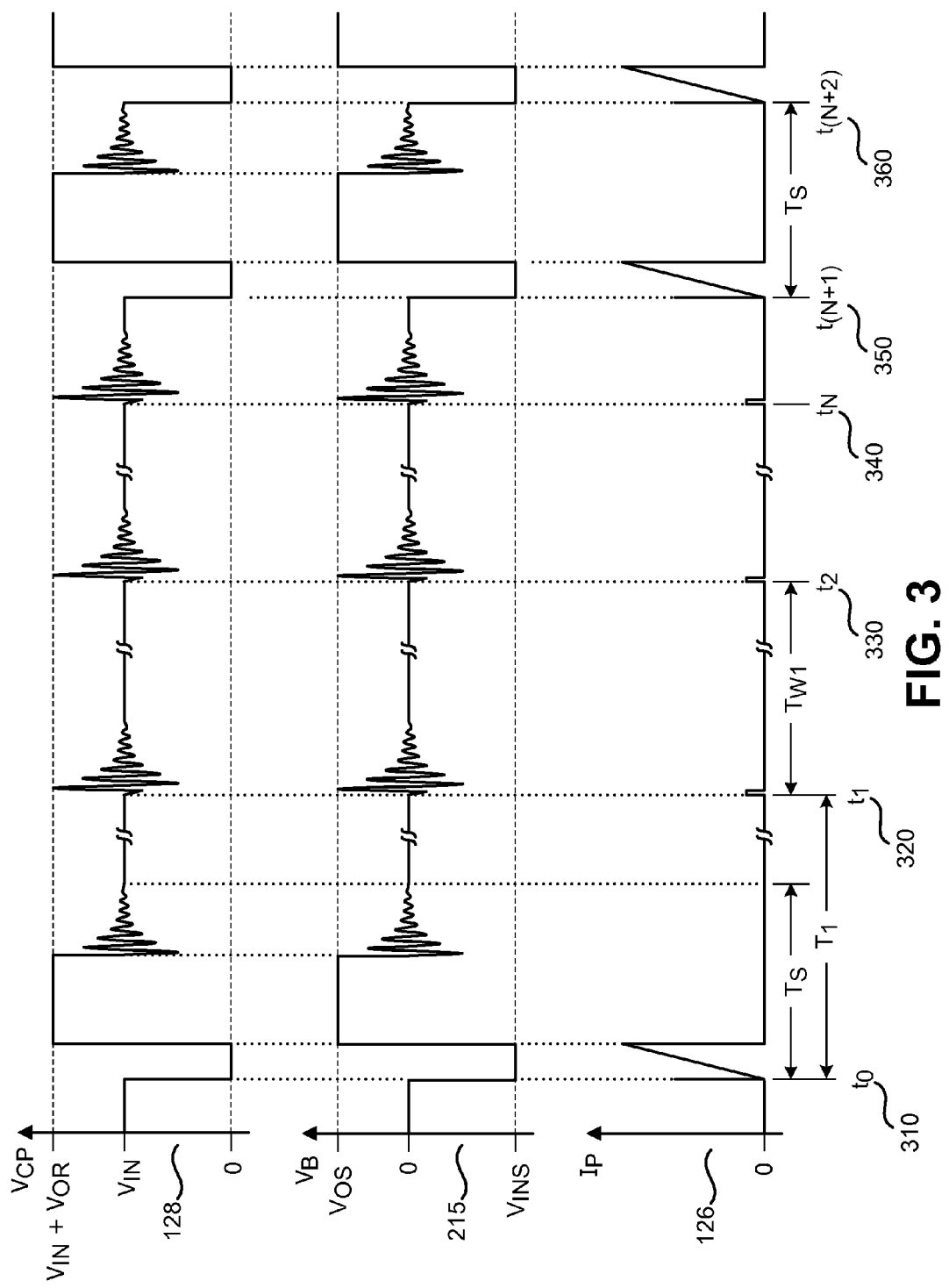
FIG. 3 shows voltage and current waveforms from an example power converter that illustrates the operation of a controller in accordance with the teachings of the present invention that provides for sensing of an isolated output voltage.

FIG. 3 shows voltage and current waveforms from the example power converter of FIG. 2 that illustrates the operation of an example controller in accordance with the teachings of the present invention that provides sensing of an isolated output voltage. As shown in the depicted example, pulses of current $I_P$ 126 that fully discharge capacitor $C_P$ 150 begin at times $t_0$ 310, $t_{(N+1)}$ 350, and $t_{(N+2)}$ 360. Pulses of current $I_P$ 126 that partially discharge capacitor $C_P$ 150 begin at times $t_1$ 320, $t_2$ 330, and $t_N$ 340 in accordance with the teachings of the present invention.

The distinction between pulses of current $I_P$ 126 that fully discharge capacitor $C_P$ 150 and pulses of current $I_P$ 126 that partially discharge capacitor $C_P$ 150 is clear in the waveform of $V_{CP}$ 128 that is the voltage on capacitor $C_P$ 150. Capacitor $C_P$ 150 is fully discharged when the voltage $V_{CP}$ 128 is substantially zero. Capacitor $C_P$ 150 is only partially discharged when the voltage $V_{CP}$ 128 remains substantially greater than zero when current $I_P$ 126 is greater than zero.

As shown, at the end of each full-discharge pulse and each partial-discharge pulse of current $I_P$ 126, voltage $V_{CP}$ 128 rises above the input voltage $V_{IN}$ 102 while energy from the energy transfer element (e.g., energy transfer element T1 105 in FIG. 1 and coupled inductor 205 in FIG. 2) charges capacitor $C_P$ 150. Voltage $V_{CP}$ 128 rises until the output rectifier D1 114 conducts, clamping the voltage $V_{CP}$ to the input voltage $V_{IN}$ plus the reflected output voltage $V_{OR}$, where the reflected output voltage $V_{OR}$ is the voltage on secondary winding 112 multiplied by the number of turns on primary winding 108 and divided by the number of turns on the secondary winding 112.

As shown, voltage $V_{CP}$ 128 remains clamped at the value of $V_{IN}$ plus $V_{OR}$ until output rectifier D1 114 stops conducting, which happens when the current from secondary winding 112 falls to zero. The energy stored in capacitor $C_P$ 150 that raised its voltage above $V_{IN}$ 102 then dissipates in a decaying oscillation with the self-inductance of primary winding 108 and the effective parasitic resistance of the circuit.

FIG. 3 also shows the voltage $V_B$ 215 in FIG. 2 that provides feedback signal $U_{FB}$ 136 to controller 142. Controller 142 may sense input voltage $V_{IN}$ 102 as well as output voltage $V_O$ 120 from bias voltage $V_B$ 215. During full-discharge pulses of current $I_P$ 126, bias voltage $V_B$ 215 goes negative to a magnitude $V_{INS}$ that is representative of input voltage $V_{IN}$ 102. After a full-discharge pulse of current $I_P$ 126, output rectifier D1 114 conducts to allow sensing of output voltage $V_O$ 120 as a positive voltage $V_{OS}$ on bias winding 210 that is representative of output voltage $V_O$ 120. After a pulse of current $I_P$ 126 that only partially discharges capacitor $C_P$ 150, output rectifier D1 114 conducts just enough to allow sensing of output voltage $V_O$ 120 with a decaying oscillation of bias voltage $V_B$ 215 as shown in FIG. 3.

In one example, when the load 122 is large enough to require full-discharge pulses of current $I_P$ 126 to maintain output voltage $V_O$ 120 at a desired value, the full-discharge pulses may occur as often as every switching period $T_S$. An example switching period $T_S$ is the time between $t_{(N+1)}$ 350 and $t_{(N+2)}$ 360 in FIG. 3. Typically, light to moderate loads may require patterns of full-discharge pulses separated by several switching periods of no current pulses.

In the example, when the load 122 is near zero, only partial-discharge pulses are used to sense the output voltage $V_O$ 120 at intervals much shorter than the period between full-discharge switching pulses in accordance with the teachings of the present invention. It is not necessary to use partial-discharge pulses to sense the output voltage $V_O$ 120 when the load 122 is sufficiently greater than zero because full-discharge pulses occur often enough at loads sufficiently greater than zero to provide adequate sensing of the output voltage. The partial-discharge pulses may be considered wake-up pulses that determine whether or not a full-discharge pulse is required. The times between partial-discharge pulses may be considered wake-up periods.

In the illustrated example, an example wake-up period $T_{W1}$ is the time between $t_1$ 320 and $t_2$ 330 in FIG. 3. In one example, wake-up period $T_{W1}$ is 16 switching periods $T_S$. In another example, wake-up pulses may be separated by wake-up periods of different durations. The first partial-discharge pulse in a train of partial-discharge pulses may follow a full-discharge pulse by a period that is different from any wake-up period within a train of wake-up pulses. FIG. 3 shows a period $T_1$ that is the time between $t_0$ 310 at the start of a full-discharge pulse and time $t_1$ 320 that is the start of the first partial-discharge pulse in a train of partial-discharge pulses. In one example, the period $T_1$ is 9 switching periods whereas $T_{W1}$ is 16 switching periods.

In one example, control circuit 144 included in controller 142 may determine the need for full-discharge pulses, partial discharge pulses, or no pulse within a switching period $T_S$ according to the value of feedback signal $U_{FB}$ 136 immediately after each pulse of current $I_P$ 126 in accordance with the teachings of the present invention. For example, if a sequence of full-discharge pulses causes the sensed output voltage $V_{OS}$ to rise beyond a first threshold value, control circuit 144 may set mode select signal 146 such that current controller 148 conducts no current for several subsequent switching periods $T_S$. If sensed output voltage $V_{OS}$ remains above the first threshold value after the next full-discharge pulse, controller 142 may conclude that the load is near zero and begin using partial discharge pulses to sense the output voltage $V_O$ 120. The example of FIG. 3 illustrates an example in which control circuit 144 determined that sensed output voltage $V_{OS}$ after the partial-discharge pulse at time $T_N$ 340 was too low, requiring consecutive full-discharge pulses at times $t_{(N+1)}$ 350 and $t_{(N+2)}$ 360.

In the example of FIG. 2, control circuit 144 interprets a signal received from first feedback circuit 138 after a full-discharge pulse, and control circuit 144 interprets a signal received from second feedback circuit 140 after a partial-discharge pulse in accordance with the teachings of the present invention. In the example of FIG. 2, first feedback circuit 138 samples feedback signal $U_{FB}$ 136 during the time when output rectifier D1 114 is conducting. In the example of FIG. 2, second feedback circuit 138 samples feedback signal $U_{FB}$ 136 during a decaying oscillation of the bias voltage $V_B$ 215 after output rectifier D1 114 stops conducting.

In the example, the peaks of the decaying oscillation in the bias voltage $V_B$ 215 are representative of output voltage $V_O$ 120 after output rectifier D1 114 stops conducting because capacitor $C_P$ 150 charges to a value representative of output voltage $V_O$ 120 when output rectifier D1 114 conducts after a partial-discharge pulse. The maximum voltage on capacitor $C_P$ 150 sets the initial condition for the decaying oscillation after output rectifier D1 114 stops conducting. Therefore, each peak in the decaying oscillation of bias voltage $V_B$ 215 is determined by the maximum voltage on capacitor $C_P$ 150 after a partial-discharge pulse.

In the example of FIG. 2, first feedback circuit 138 samples feedback signal $U_{FB}$ 136 to regulate output voltage $V_O$ 120 over a wide range of loads. In contrast to first feedback circuit 138, second feedback circuit 140 in one example does not sample feedback signal $U_{FB}$ 136 to regulate output voltage $V_O$ 120 over a wide range of load. Instead, second feedback circuit 140 in the example is used only to determine whether or not there has been a sufficient change in the output voltage $V_O$ 120 during a train of partial-discharge pulses to require a change in operating mode in accordance with the teachings of the present invention.

Specifically, in one example, second feedback circuit 140 holds the value of the second peak in the decaying oscillation of feedback signal $U_{FB}$ 136, as illustrated for example in FIG. 3 with the decaying oscillations in $V_B$ 215 after the first partial-discharge pulse in a train of consecutive partial-discharge pulses, and compares it to samples of the second peak in the decaying oscillation of feedback signal $U_{FB}$ 136 after each subsequent partial-discharge pulse in the train of consecutive partial-discharge pulses. When the value of a subsequent sample is less than the value of the first sample by a threshold value, control circuit 144 determines that output voltage $V_O$ 120 is too low, and sets mode select signal 146 to start a sequence of full-discharge pulses. It is appreciated that any peak value in the decaying oscillation may be sampled for use in the comparison. In one example, the second peak value may be a preferred peak because it has the highest magnitude and is relatively free from noise and distortion that may be present on the first peak while the output rectifier D1 114 is conducting. In one example, the threshold value is 30 millivolts.

In one example, the magnitude and duration of a partial-discharge pulse are just sufficient to allow output rectifier D1 114 to conduct at the end of the partial-discharge pulse. In another example, the magnitude and duration of a partial-discharge pulse are more than sufficient to allow output rectifier D1 144 to conduct at the end of the partial-discharge pulse. The output voltage $V_O$ 120 may be sensed with greater accuracy when output rectifier D1 144 is allowed to conduct until a transient voltage associated with non-ideal coupling of the windings of coupled inductor 205 reduces to a negligible value. The non-ideal coupling, sometimes quantified as a leakage inductance, may produce a voltage between output rectifier D1 144 and secondary winding 112 when diode D1 144 begins to conduct. The transient voltage owing to leakage inductance may also distort the first peak of the decaying oscillation. Therefore, it is desirable to allow the voltage from the leakage inductance to reduce to a negligible value so that capacitor $C_P$ 150 charges to a voltage that more accurately represents output voltage $V_O$ 120 before output rectifier D1 144 stops conducting. It is also desirable not to sample the first peak of the decaying oscillation to avoid distortion from the effects of leakage inductance.

In one example, the magnitude of the partial-discharge pulse is 16 milliamperes whereas the peak current of a full-discharge pulse is 250 milliamperes. As such, the energy transferred to the output by the partial-discharge pulse may be considered insignificant in comparison to the energy transferred to the output by the full-discharge pulse because the energy transferred is proportional to the square of the peak current in primary winding 108. It will be appreciated that since the partial-discharge pulse may transfer finite energy to the output, controllers that have a minimum switching frequency, however small, may require the power supply to have a dummy internal load to keep the output voltage $V_O$ 120 from going higher than desired as the output current $I_O$ 118 approaches zero.

It may be determined either analytically or experimentally that there is a magnitude and a duration for a partial-discharge pulse that gives a minimum power loss in the power converter for a particular set of circumstances. The duration of the partial-discharge pulse is typically less than half of one period of the decaying oscillation of feedback signal $U_{FB}$ 136 as illustrated in FIG. 3. In one example, the duration of the partial-discharge pulse is approximately one quarter of one period of the decaying oscillation of feedback signal $U_{FB}$ 136. In one example where the inductance of the primary winding 108 of a coupled inductor is 2.2 millihenries, capacitor $C_P$ 150 is approximately 70 picofarads, the partial discharge pulse is 16 milliamperes for a duration of approximately 600 nanoseconds. It will be appreciated that in one example control circuit 144 may adjust the magnitude and duration of partial-discharge pulses to achieve minimum power loss in the power converter and to guarantee that output rectifier D1 114 conducts in accordance with the teachings of the present invention. This adjustment may be done, for example, in response to an external signal received by controller 144. The adjustment may also be done by choosing values of discrete components within control circuit 144. In examples where control circuit 144 is included in an integrated circuit, the adjustment may be done by trimming the internal parameters of the integrated circuit.

Figure 4:
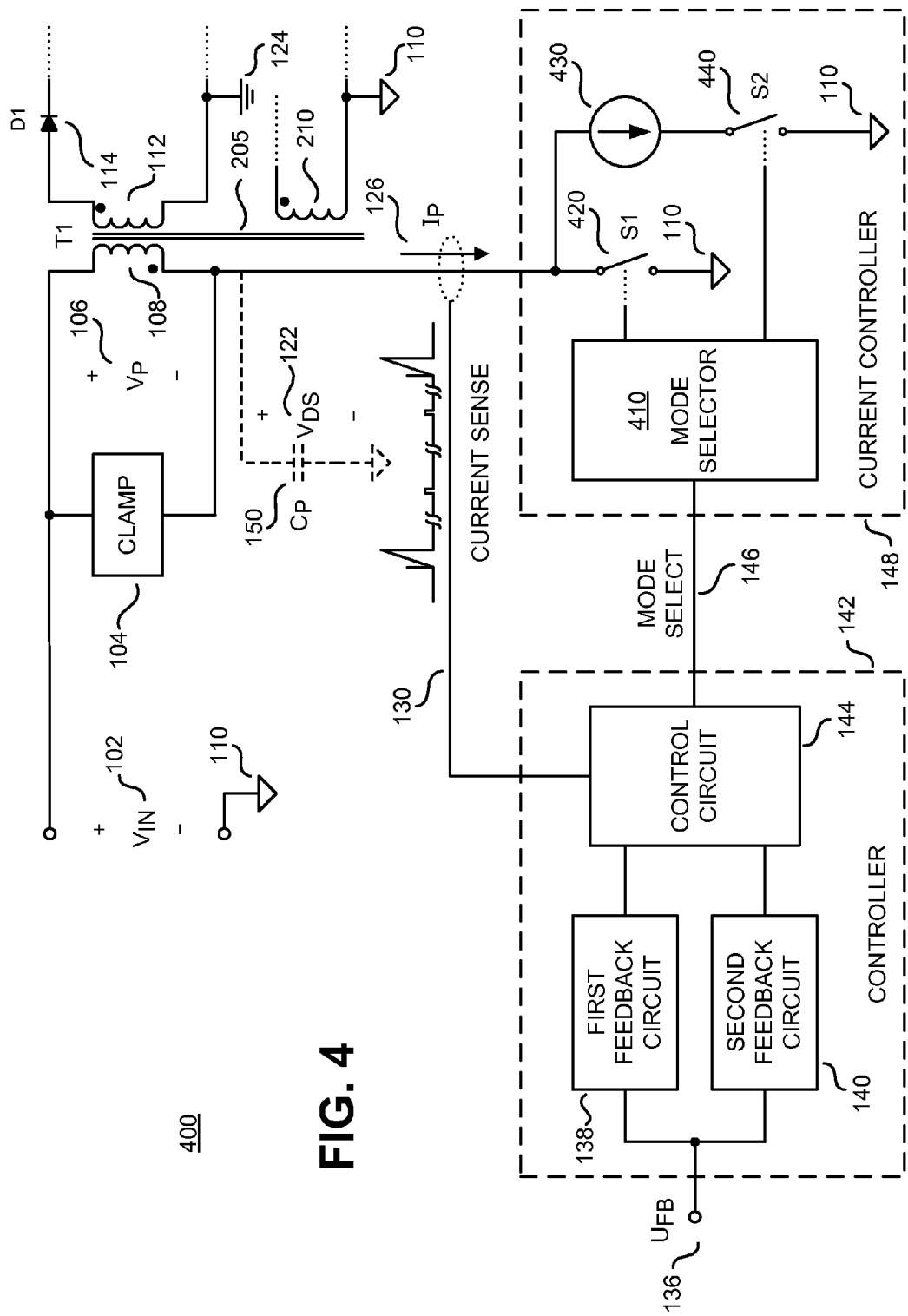
FIG. 4 shows one example of a power converter that illustrates one example of a current controller in accordance with the teachings of the present invention.

FIG. 4 is a schematic diagram of a power converter 400 that illustrates one example of current controller 148 in greater detail. In the example of FIG. 4, current controller 148 includes a mode selector 410 that receives mode select signal 146 from controller 142. In the example of FIG. 4, mode selector 410 closes either switch S1 420, or switch S2 440, or neither switch in response to mode select signal 146.

In the example of FIG. 4, the first mode opens switch S1 420 and switch S2 440 such that current $I_P$ 126 is substantially zero when current controller 148 is in the first mode. In the example of FIG. 4, the second mode closes switch S1 420 and opens switch S2 440 to fully discharge capacitor $C_P$ 150. In the example of FIG. 4, the third mode opens switch S1 420 and closes switch S2 440 such that current $I_P$ 126 is the value of current source 430 to partially discharge capacitor $C_P$ 150 in accordance with the teachings of the present invention. It is appreciated that in other examples current source 430 could be a variable current source that varies in accordance with the degree of partial discharge of capacitor $C_P$ 150 desired.

Figure 5:
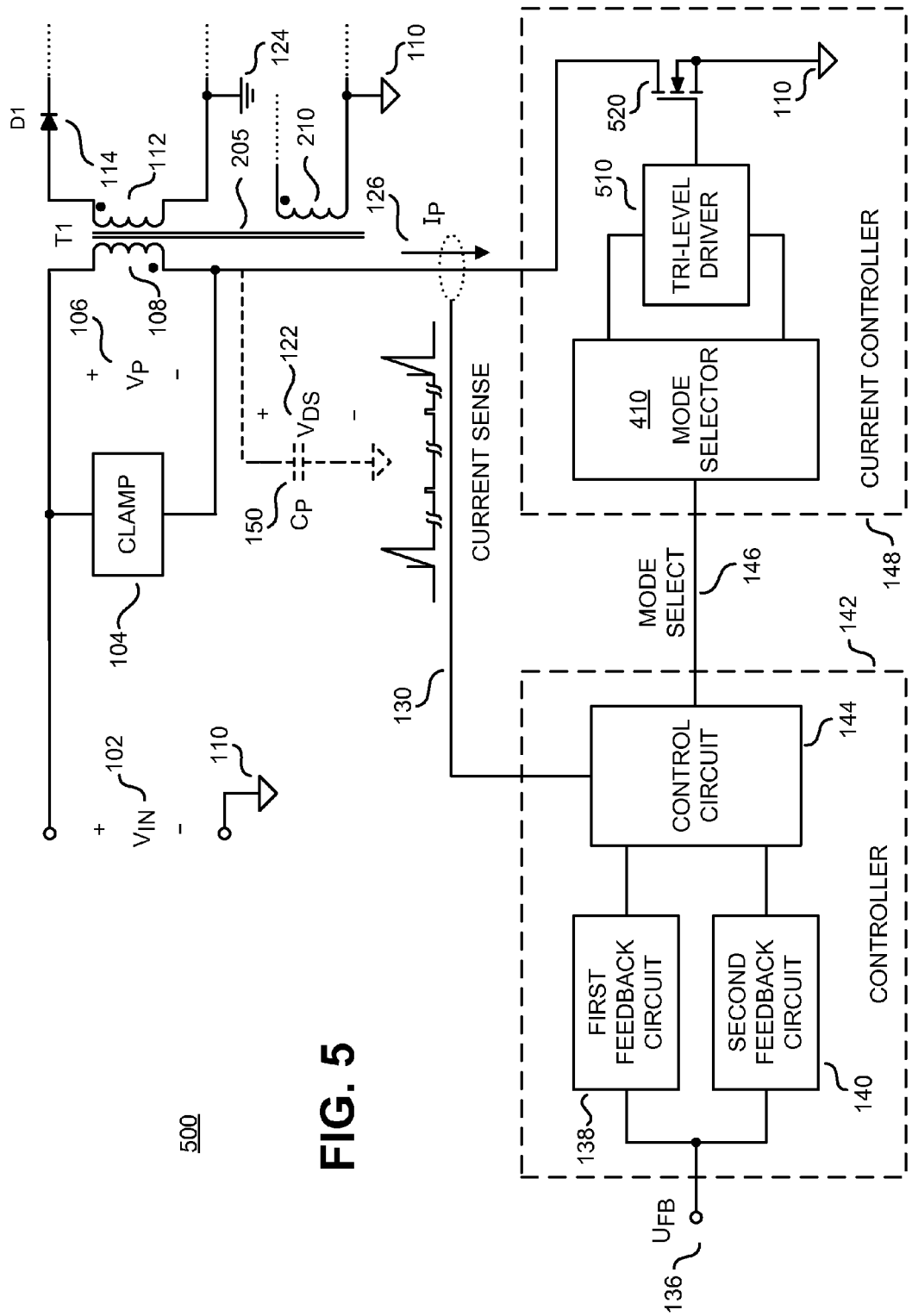
FIG. 5 shows one example of a power converter that illustrates another example of a current controller, which uses a transistor for sensing of an isolated output voltage in accordance with the teachings of the present invention.

FIG. 5 is a schematic diagram of a power converter 500 that shows another example of current controller 148 that includes a metal oxide semiconductor field-effect transistor (MOSFET) 520 and a tri-level driver 510 to produce full-discharge and partial-discharge pulses of current $I_P$ 126 in response to the mode select signal 146. In the example of FIG. 5, tri-level driver 510 responds to signals from mode selector 410 to produce at least three distinct values of a voltage between the gate terminal and the source terminal of n-channel MOSFET 520 in response to mode select signal 146. In one example, the gate terminal of MOSFET 520 may be considered as a control terminal of MOSFET 520.

In the example of FIG. 5, the first mode of current controller 148 applies a gate-to-source voltage substantially less than the threshold voltage of n-channel MOSFET 520. As a result, MOSFET 520 is substantially switched OFF in the first mode of operation of current controller 148. In the example of FIG. 5, the second mode of current controller 148 applies a gate-to-source voltage substantially greater than the threshold voltage of n-channel MOSFET 520. As a result, MOSFET 520 is substantially switched ON in the second mode of operation of current controller 148. In the example of FIG. 5, the third mode of current controller 148 applies a gate-to-source-voltage slightly higher than the threshold voltage of n-channel MOSFET 520. As a result, the gate-to-source voltage at the control terminal of MOSFET 520 in the third mode corresponds to MOSFET 520 providing a partial-discharge current pulse for the magnitude of current $I_P$ 126. In other words, when in the third mode of operation, MOSFET 520 operates not as a switch that may be either open or closed, but in its saturation region, sometimes called the active region, where the drain current is controlled primarily by the gate-to-source voltage and is substantially independent of the drain-to-source voltage. In examples where MOSFET 520 and tri-level driver 510 are included in an integrated circuit, tri-level driver 510 may be designed such that the voltage applied to the gate during the third mode of current controller 148 tracks the threshold voltage of MOSFET 520, thereby reducing the change in partial-discharge current over a range of temperature and process variations. It is appreciated that in other examples, tri-level driver 510 could have four or more drive levels to select different MOSFET 520 saturation characteristics according to the degree of partial discharge of capacitor $C_P$ 150 desired.

Figure 6:
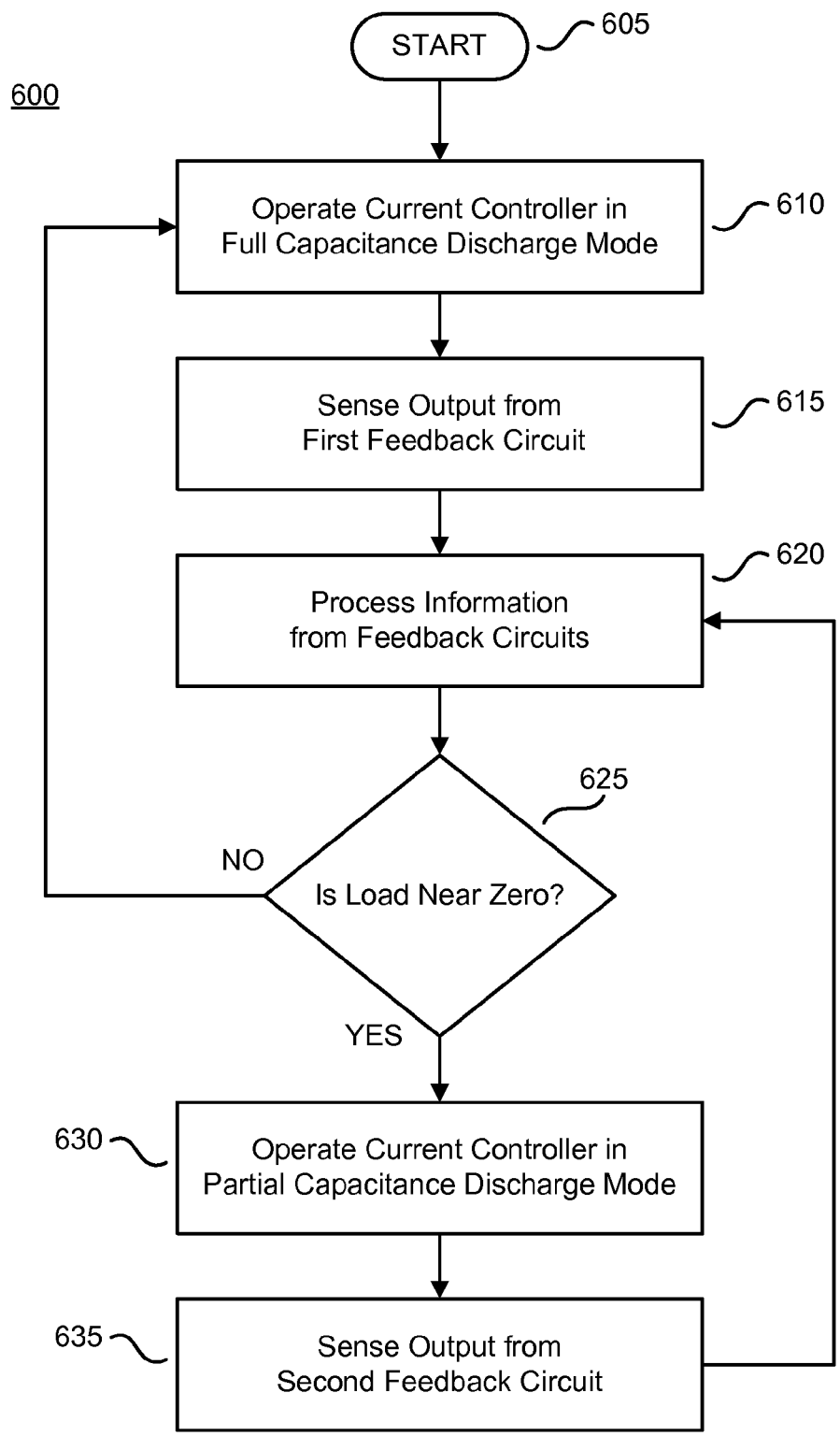
FIG. 6 is flow diagram that shows one example method to control a power converter in accordance with the teachings of the present invention that provides for sensing of an isolated output voltage.

FIG. 6 is a flow diagram 600 that shows one example method to control a power converter in accordance with the teachings of the present invention providing for sensing of an isolated output. After starting in block 605, a current controller is operated in full capacitance discharge mode in block 610 to produce a current pulse that fully discharges capacitance on a node of the current controller.

Next, a first feedback circuit senses the isolated output voltage in block 615. In block 620, information from feedback circuits is processed to estimate the condition of the load. Then, in decision block 625, the flow continues to block 630 if the load is near zero, or branches back to block 610 if the load is not near zero. In one example, the load is considered near zero when the full-discharge pulses occur at intervals greater than the wake-up period $T_{W1}$ of FIG. 3.

In block 630, the current controller is operated in partial capacitance discharge mode to produce a current pulse that only partially discharges a capacitance on a node of the current controller. Then a second feedback circuit senses the isolated output voltage in block 635 before returning to block 620 where the information from feedback circuits is processed.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, comprising:
a control circuit to be coupled to a current controller coupled to an energy transfer element, wherein a first, second or third current is enabled in the current controller in response to the control circuit, wherein the first current is substantially zero, the second current is greater than the third current, and the third current is greater than the first current, wherein the third current is controlled to only partially discharge a capacitance coupled to a terminal coupled between the energy transfer element and the current controller;
a first feedback circuit coupled to the control circuit and coupled to generate a first feedback signal representative of an output of the power converter while the first current is enabled in the current controller after a full discharge pulse of current through the current controller; and
a second feedback circuit coupled to the control circuit and coupled to generate a second feedback signal representative of the output of the power converter while the first current is enabled in the controller after a partial discharge pulse of current through the current controller.

2. The controller of claim 1 wherein the control circuit is coupled to enable the first, second or third currents in the current controller in response to the first and second feedback signals to control a transfer of energy from an input of the power converter to the output of the power converter.

3. The controller of claim 1 wherein the current controller comprises a transistor coupled to the energy transfer element and an input of the power converter.

4. The controller of claim 1 wherein the current controller comprises a tri-level driver to provide a voltage having first, second and third values in response to the control circuit to a control terminal of a transistor coupled to the energy transfer element and an input of the power converter.

5. The controller of claim 1 wherein the current controller comprises a transistor coupled to be OFF when the first current is enabled in the current controller.

6. The controller of claim 1 wherein the current controller comprises a transistor coupled to be ON when the second current is enabled in the current controller.

7. The controller of claim 1 wherein the current controller comprises a MOSFET coupled to operate in a saturation region of the MOSFET when the third current is enabled in the current controller.

8. The controller of claim 1 wherein the first feedback circuit is coupled to the energy transfer element to generate the first feedback signal in response to a reflected signal representative of the output of the power converter.

9. The controller of claim 1 wherein the second feedback circuit is coupled to the energy transfer element to generate the second feedback signal in response to a portion of a decaying oscillation in a reflected signal representative of the output of the power converter.

10. The controller of claim 1 wherein the full discharge pulse of current through the current controller occurs in response to the control circuit enabling the second current in the current controller followed by the control circuit enabling the first current in the current controller.

11. The controller of claim 1 wherein the partial discharge pulse of current through the current controller occurs in response to the control circuit enabling the third current in the current controller followed by the control circuit enabling the first current in the current controller.

* * * * *